(12) United States Patent
Waugh

(10) Patent No.: US 12,506,613 B2
(45) Date of Patent: Dec. 23, 2025

(54) METHODS AND SYSTEMS FOR GENERATING AND VALIDATING USES OF DIGITAL CREDENTIALS AND OTHER DOCUMENTS

(71) Applicant: Donald Craig Waugh, Oakville (CA)

(72) Inventor: Donald Craig Waugh, Oakville (CA)

( * ) Notice: Subject to any disclaimer, the term of this patent is extended or adjusted under 35 U.S.C. 154(b) by 0 days.

(21) Appl. No.: 18/292,708

(22) PCT Filed: Sep. 28, 2022

(86) PCT No.: PCT/CA2022/000055
§ 371 (c)(1),
(2) Date: Jan. 26, 2024

(87) PCT Pub. No.: WO2023/004491
PCT Pub. Date: Feb. 2, 2023

(65) Prior Publication Data
US 2024/0364526 A1  Oct. 31, 2024

Related U.S. Application Data

(60) Provisional application No. 63/402,865, filed on Aug. 31, 2022, provisional application No. 63/226,636, filed on Jul. 28, 2021.

(51) Int. Cl.
| | |
|---|---|
| *H04L 9/32* | (2006.01) |
| *G06F 21/32* | (2013.01) |
| *G06F 21/44* | (2013.01) |
| *G06F 21/64* | (2013.01) |
| *G06F 21/84* | (2013.01) |
| *H04L 9/08* | (2006.01) |

(52) U.S. Cl.
CPC .......... *H04L 9/3231* (2013.01); *H04L 9/0825* (2013.01); *H04L 9/3247* (2013.01)

(58) Field of Classification Search
CPC ... H04L 9/3231; H04L 9/0825; H04L 9/3247; G06F 21/84; G06F 21/44; G06F 21/64; G06F 21/32
See application file for complete search history.

(56) References Cited

U.S. PATENT DOCUMENTS

| | | | | |
|---|---|---|---|---|
| 10,027,662 | B1 * | 7/2018 | Mutagi | H04L 63/0861 |
| 10,154,029 | B1 * | 12/2018 | Griffin | H04L 63/06 |
| 10,432,605 | B1 * | 10/2019 | Lester | H04L 63/08 |
| 10,469,487 | B1 * | 11/2019 | Griffin | H04L 9/3247 |
| 10,715,520 | B2 * | 7/2020 | Bhatt | H04L 63/0861 |
| 10,855,473 | B1 * | 12/2020 | Griffin | H04L 9/3239 |
| 11,025,435 | B2 * | 6/2021 | Li | H04L 9/3239 |

(Continued)

*Primary Examiner* — Darren B Schwartz
(74) *Attorney, Agent, or Firm* — Dickinson Wright LLP; Matthew D. Powell

(57) ABSTRACT

In one aspect, there is provided a processor-implemented method conducted by an issuer system for issuing a new verifiable document. In another aspect, there is provided a processor-implemented method conducted by a user terminal for obtaining a new verifiable document. In another aspect, there is provided a processor-implemented method conducted by a verifier system for verifying valid use of a verifiable document. In another aspect, there is provided a processor-implemented method conducted by a user terminal for obtaining verification of valid use of a verifiable document.

18 Claims, 8 Drawing Sheets

(56) References Cited

U.S. PATENT DOCUMENTS

| | | | | |
|---|---|---|---|---|
| 11,070,378 | B1* | 7/2021 | Griffin | H04L 9/50 |
| 11,405,387 | B1* | 8/2022 | Griffin | H04L 9/0866 |
| 2003/0115475 | A1* | 6/2003 | Russo | H04L 9/3231 |
| | | | | 713/186 |
| 2009/0164796 | A1* | 6/2009 | Peirce | H04L 9/3234 |
| | | | | 713/186 |
| 2012/0314911 | A1* | 12/2012 | Paul | G06V 40/70 |
| | | | | 382/115 |
| 2014/0096215 | A1* | 4/2014 | Hessler | H04W 12/06 |
| | | | | 726/7 |
| 2015/0095987 | A1* | 4/2015 | Potash | H04L 63/08 |
| | | | | 726/4 |
| 2015/0294139 | A1* | 10/2015 | Thompson | G06F 21/32 |
| | | | | 382/112 |

\* cited by examiner

METHODS AND SYSTEMS FOR GENERATING AND VALIDATING USES OF DIGITAL CREDENTIALS AND OTHER DOCUMENTS

CROSS REFERENCE TO RELATED APPLICATIONS

This application claims priority to U.S. Provisional Patent Application Ser. No. 63/226,636 filed on Jul. 28, 2021 entitled "Method To Verify And Authenticate A User Associated Document Using Biometrics", and to U.S. Provisional Patent Application Ser. No. 63/402,865 filed on Aug. 31, 2022 entitled "Method To Verify And Authenticate A User Associated Document Using Biometrics", the contents of each which are incorporated herein by reference in their entirety.

FIELD OF THE INVENTION

The following relates generally to digital verification and authentication of individuals, and more particularly to the use of biometrics for generating, and validating uses by users of, individuals' digital credentials and other verifiable documents.

BACKGROUND OF THE INVENTION

Secure electronic communications between terminals interconnected by a computer network has a long and important history of development. It is known to establish cryptographic communications sessions over communication channels as between terminals to facilitate the sharing of secure information. For example, asymmetric encryption keys and PKI (Public Key Infrastructure) technology, using public and private key pairs, has been in use for a long time.

It is known for users, using user terminals and in coordination with other computer terminals, to share verifiable documents such as verifiable credentials via communication networks. Such documents/credentials may be digitally signed by a third party issuer system such as a credential provider so as to provide verification to other third parties as to their validity as credentials and/or as to their general validity in the view of the issuer. However, despite mechanisms available for restricting access to such verifiable credentials, such as storage systems that are accessible only upon provision by a user of a password, or the provision of a private key, improvements are desirable for validating uses by users of digital credentials and other verifiable documents.

SUMMARY OF THE INVENTION

The present description is directed to the creation of verifiable documents, such as verifiable credentials. The present description is also directed to a verifiable document stored on a processor-readable medium, the verifiable document being optionally digitally-signed by an authorized third party such as a credential issuer, and including document content bound to encrypted biometric data that can only be decrypted using the private cryptographic key of an individual to whom the biometric data pertains. The document content may be credential content such as data pertaining to an individual's national citizenship, professional or academic qualifications, a right to enter a controlled area, and/or any other document content. The biometric data may be face biometric data such as one or more images containing a respective face, one or more face templates generated based on faces contained in respective images, and/or other uniquely-identifying biometric data of an individual. The present description is also directed to determining, at the time of an attempted use of a verifiable document by a user, whether or not the attempted use by the user is valid. Attempted use of a verifiable document may include an attempt by a user to access its contents, an attempt by the user to present the verifiable document as a credential, an attempt by the user to wield the verifiable document in some other context, and/or any other attempted use by the user. The present description sets forth processes and frameworks for collecting and deploying biometric data to determine, at the time of an attempted use of a verifiable document, whether or not the individual to whom the verifiable document pertains is himself/herself the user attempting the use. This process may be conducted in conjunction with a process for determining whether or not the verifiable document itself is digitally-signed by an authorized third party.

In accordance with an aspect, there is provided a processor-implemented method conducted by an issuer system for issuing a new verifiable document, the method comprising: establishing a cryptographic communications session over a communication channel with a user terminal; receiving a request from the user terminal for a new verifiable document; verifying an identity of a user of the user terminal based on a comparison of data from at least one image captured of the user during the session by the user terminal and photoID data obtained during the session by the user terminal; responsive to verifying the identify of the user of the user terminal, transmitting a notice of identity verification to the user terminal; responsive to transmitting the notice of identity verification, receiving, from the user terminal, an encrypted biometric data component, the biometric data of the encrypted biometric data component accessible only upon decryption using a private key of the user terminal, the private key corresponding to a public key used to encrypt the encrypted biometric data, wherein the biometric data of the biometric data component comprises the data used in the comparison; generating a new verifiable document comprising a content component and the encrypted biometric data component; digitally-signing, by the verifier system, the new verifiable document; and transmitting the digitally-signed new verifiable document to the user terminal for control by the user terminal.

In embodiments, verifying the identity of the user of the user terminal comprises: receiving at least one recognition score, the at least one recognition score generated based on a comparison between: biometric data from the at least one image captured of the user during the session by the user terminal; and the photoID data.

In embodiments, the at least one recognition score is received from the user terminal.

In embodiments, the at least one recognition score is generated by the issuer system based in part on securely receiving, by the issuer system, the biometric data from the at least one image captured of the user during the session by the user terminal and the photoID data.

In embodiments, the photoID data comprises at least one of: image data captured of a photoID by an image capture device of the user terminal during the session; image data of a photoID retrieved by the user terminal from storage during the session; image data retrieved by the verifier system from a photo database responsive to receipt, from the user terminal, of the image data captured of the photoID by the image capture device or the image data of the photoID retrieved by the user terminal from storage.

In embodiments, the new verifiable document is a verifiable credential.

In accordance with another aspect, there is provided a processor-implemented method conducted by a user terminal for obtaining a new verifiable document, the method comprising: establishing a cryptographic communications session over a communication channel with an issuer system; transmitting a request to the issuer system for the new verifiable document; causing the provision of evidence of identity of the user of the user terminal to the issuer system, the evidence of identity comprising at least one recognition score generated based on a comparison of data from at least one image captured of the user during the session by the user terminal and photoID data obtained during the session by the user terminal; receiving, from the issuer system, a notice of identify verification; responsive to receiving the notice of identity verification, generating a biometric data component comprising the data used in the comparison; encrypting, by the user terminal, the biometric data component using a public key of the user terminal thereby to generate an encrypted biometric data component, the biometric data of the encrypted biometric data component accessible only upon decryption using a private key of the user terminal corresponding to a public key used to encrypt the encrypted biometric data; digitally-signing, by the user terminal, the encrypted biometric data component; transmitting the digitally-signed encrypted biometric data component to the issuer system; responsive to transmitting the digitally-signed encrypted biometric data component to the issuer system, receiving, from the issuer system, the new verifiable document, wherein the new verifiable document is digitally-signed by the issuer system and comprises a content component and the encrypted biometric data component.

In embodiments, the at least one recognition score is transmitted by the user terminal.

In embodiments, the at least one recognition score is generated by the issuer system based in part on securely transmitting, by the user terminal, the biometric data from the at least one image captured of the user during the session by the user terminal and the photoID data.

In embodiments, the photoID data comprises at least one of: image data captured of a photoID by an image capture device of the user terminal during the session; image data of a photoID retrieved by the user terminal from storage during the session; and image data retrieved by the issuer system from a photo database responsive to receipt, from the user terminal, of the image data captured of the photoID by the image capture device or the image data of the photoID retrieved by the user terminal from storage.

In embodiments, the new verifiable document is a verifiable credential.

According to another aspect, there is provided a processor-implemented method conducted by a verifier system for verifying valid use of a verifiable document, the method comprising: establishing a cryptographic communications session over a communication channel with a user terminal; receiving, in association with a verification request from the user terminal, a verifiable document, the verifiable document comprising a content component and an encrypted biometric data component, the biometric data of the encrypted biometric data component accessible only upon decryption using a private key of the user terminal, the private key corresponding to a public key used to encrypt the encrypted biometric data; verifying whether the verifiable document is digitally-signed by an authorized credential issuer; responsive to verifying that the verifiable document is digitally-signed by the authorized credential issuer, determining whether the user terminal during the session is under the control of an individual to whom the biometric data component pertains; responsive to determining that the user terminal during the session is under the control of the individual to whom the biometric data component pertains, transmitting a notice of verification of valid use of the verifiable document to the user terminal, wherein the user terminal, the authorized credential issuer, and the verifier system are third parties with respect to each other.

In embodiments, determining whether the user terminal during the session is under the control of the individual to whom the biometric data component pertains comprises: transmitting a request for a biometric confirmation to the user terminal, the request including the encrypted biometric data component; receiving at least one recognition score based on a comparison of the biometric data component with biometric data from at least one image captured by the user terminal, during the session, of a user controlling the user terminal; and responsive to each of the at least one recognition score meeting or exceeding a threshold level, determining that the user controlling the user terminal during the session is the individual to whom the biometric data component pertains.

In embodiments, receiving, in association with the verification request from the user terminal, the verifiable document comprises receiving the verifiable document from the user terminal.

In embodiments, the comparison is conducted by the verifier system based in part on securely receiving, by the verifier system, the biometric data from the at least one image captured by the user terminal, during the session, of the user controlling the user terminal.

In embodiments, the comparison is conducted by the user terminal.

In embodiments, the verifiable document is a verifiable credential.

In embodiments, the biometric data component comprises: (a) at least one of: an image captured of the individual at the time the individual applied for the verifiable document, and a biometric face template generated based on the image captured of the individual at the time the individual applied for the verifiable document; and (b) at least one of: a photoID photo captured and/or retrieved at the time the individual applied for the verifiable document, and one or more biometric face templates generated respectively based on the photoID photo captured and/or retrieved at the time the individual applied for the verifiable document.

According to an aspect, there is provided a processor-implemented method conducted by a user terminal for obtaining verification of valid use of a verifiable document, the method comprising: establishing a cryptographic communications session over a communication channel with a verification system; transmitting a verification request to the verification system in association with a verifiable document, the verifiable document comprising a content component and an encrypted biometric data component, the biometric data of the encrypted biometric data component accessible only upon decryption using a private key of the user terminal, the private key corresponding to a public key used to encrypt the encrypted biometric data; receiving a request for a biometric confirmation from the verification system, the request including the encrypted biometric data component; decrypting the encrypted biometric data component using the private key of the user terminal; generating at least one recognition score based on a comparison of the biometric data component with biometric data from at least one image captured by the user terminal, during the session, of a user controlling the user terminal; transmitting the at least one recognition score to the verification system; responsive to the verification system determining that the at least one recognition score meets or exceeds a threshold level, receiving a notice of verification of valid use of the verifiable document from the verifier system.

In embodiments, transmitting, in association with the verification request from the user terminal, the verifiable document comprises transmitting the verifiable document from the user terminal.

In embodiments, the comparison is conducted by the verifier system based in part on securely transmitting, by the user terminal, the biometric data from the at least one image captured by the user terminal, during the session, of the user controlling the user terminal.

In embodiments, the comparison is conducted by the user terminal.

In embodiments, the verifiable document is a verifiable credential.

In embodiments, the biometric data component comprises: (a) at least one of: an image captured of the individual at the time the individual applied for the verifiable document, and a biometric face template generated based on the image captured of the individual at the time the individual applied for the verifiable document; and (b) at least one of: a photoID photo captured and/or retrieved at the time the individual applied for the verifiable document, and one or more biometric face templates generated respectively based on the photoID photo captured and/or retrieved at the time the individual applied for the verifiable document.

According to other aspects, there are provided non-transitory processor readable media each embodying processor-readable program code for performing the individual methods described herein.

According to other aspects, there are provided systems each comprising at least one computer processor and at least one non-transitory processor-readable medium embodying processor-readable program code for performing the individual methods described herein.

Other aspects and advantages will be apparent upon reading the following.

BRIEF DESCRIPTION OF THE DRAWINGS

Embodiments of the invention will now be described with reference to the appended drawings in which.

DETAILED DESCRIPTION

Figure 1:
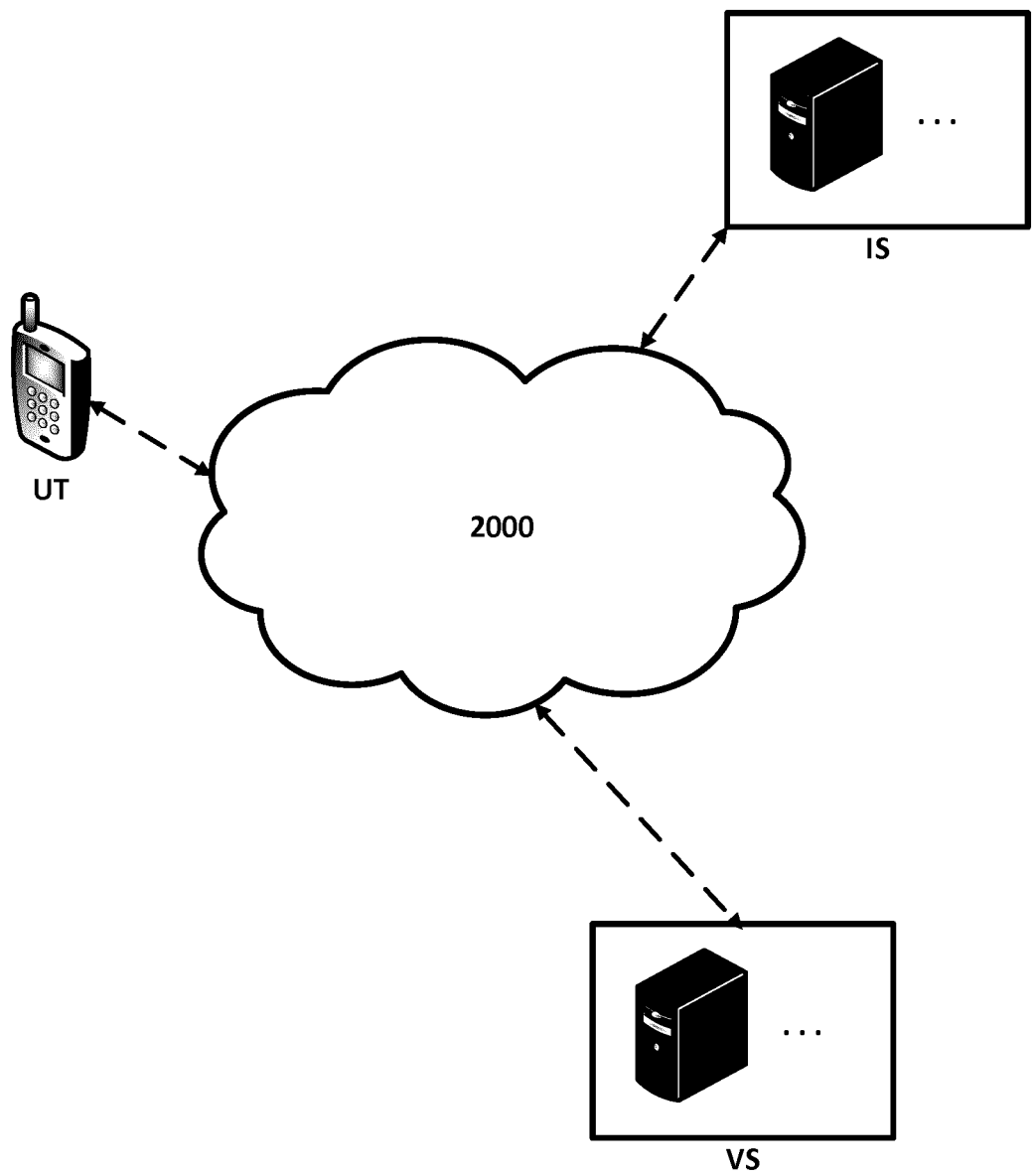
FIG. 1 is a basic network diagram showing cryptographic communications sessions over communication channels between computing devices for the purpose of securely exchanging information such as verifiable credentials and other documents.

An encryption/decryption system may include a means for user verification, authentication and document authentication using face biometrics. The encryption/decryption system comprises a key storage means for storing a plurality of keys, a face authentication means for determining whether a prospective user of a key in the plurality of keys is the associated user of the key, an encryption/decryption means for encrypting and decrypting data using the plurality of keys when the face authentication means authenticates the prospective user. An identity verification means for determining whether a prospective user is the actual person as part of an identity verification process using face recognition and an encryption/decryption system to provide a means to encrypt the face recognition result into a document. A document authentication means that authenticates the user for access to their plurality of keys to access document and match the users face used to authenticate access to their plurality of keys in or associated with the document and the extracted face recognition result bound to the document and to provide the match result to a party to authenticate that the documents is controlled by the legitimate user.

What is required therefore is a system and method that credential issuers, credentials owners and credential verifiers to provide methods that bind personal biometrics with verifiable credentials to ensure that only the bonafide credential owner can access the credential providing assurance to issuing parties and their owners that credentials issued cannot be stolen, shared or otherwise compromised and provide assurance to relying parties that offers trust in terms of the verification and authentication of the person, their credentials, and the proof that the credential is under the control and is presented by of the owner of the credential while preserving the privacy of the individual This patent teaches how a document or credential issuer can leverages an identity verification process using biometrics to bind a document or credential to a user and provide a mechanism for proof of user ownership and control by the user. This patent application teaches how the document or credential issuer embeds inside a document or credential evidence of the of the applicant's ownership of the document or credential. This provides a mechanism where should the document or credential issuer require future proof of user ownership and control or for a relying party to require proof of ownership and control the document, proof of ownership and control is embedded inside the document that the user can utilize to provide proof of ownership and control of document or credential. The key feature is the user in collaboration with the issuer facilitate the binding of the biometrics to the document or credentials and it is the issuer that is signing the credentials and not the user For self sovereign agents or agents and the verifiable credentials they acquire, hold and present, face biometrics provides additional capabilities including Identity Verification Enrolling and issuing credentials is a significant challenge. How can you trust the applicant? Ver-ID can validate a passport, a driver's license, or health card with face recognition technology. Facial biometric technology has proven to be more accurate than having traditional verification performed by people. The ability to take a selfie with liveness detection and match against the photo in the ID provides a private, secure, accurate and scalable solution to automate user enrollment and credential issuance.

Binding biometrics to credentials. Credential issuers can bind verifiable credentials with the face of the owner so that the credentials can only be used by the credential owner. This extra face authentication step provides assurance to the credential issuer that the credentials they issue can only be used by the credential owner preventing credentials from being stolen or someone impersonating the owner.

Relying parties. Face biometrics bound to verifiable credentials provides relying parties the assurance that only the credential owner can present the credential. Control over the agent and the credential is enforced by the face recognition that was established by the issuing party's identity verification process that is embedded in the credential itself.

This present invention offers a significant improvement over existing self sovereign agent and verifiable credentials technology by providing assurance to credentials issuers, credential owners and credential verifiers that the verifiable credential can only be controlled by the legitimate owner. This is accomplished by binding and encrypting verifiable credentials with the biometrics of the owner as part of identity verification process that then binds the biometrics of the owner to the credential being issued which can be later used to prove ownership and possession using biometrics of the owner.

The present invention meets the needs of verifiable credential issuers and the verifiable credentials they issue by providing a method for binding the verifiable credentials with the biometrics of the applicant for the verifiable credential by verifying the applicant by the applicant presenting a government photo ID, such as a driver license, and matching the photo of the applicant on the ID with a selfie of the applicant. This matching can extend for an even greater level of security by matching the photo that is in the government photo ID database against the photo in the photo ID and the applicant's selfie. Face recognition converts the photos and selfie to what is known as a facial code or facial templates which are mathematical representations of the faces captured. The template are then matched and scored to provide a method to verify the applicant.

The invention augments a verifiable credential by encrypting and appending the biometric templates and optionally a photo of the applicant that was used for verifying the applicant applying for the credentials. By appending the biometrics to the credentials of the applicant the credential is created for future authentication of the credential and the owner of the credential which can be either separately or combined to prove ownership of the credential.

The present invention offers the benefits of digitally signed documents in accordance with verifiable credentials and self sovereign agents that brings verification of the individual presence and ownership of the verifiable credential that is a simple, easy, and cost-effective solution. The invention provides a method that removes the need for a costly witness or notary as it is the individual authenticating against the biometrics in their credential that asserts their identity and not a third party.

One aspect of the present invention binds the user's face to their private key such that the user's live face must authenticate against their enrolled face in order to release the private key for decrypting their credentials.

Another aspect of the present invention captures and authenticates a user's photo id (examples of suitable photo id include drivers license, health card, passport) by verifying the user's face to the face in the photo visible on their photo ID and optionally the source database that created the photo ID that is stored in a government database with such biometrics providing a level of assurance the for identity verification that when converted to an enrollment template provides a level of assurance for the ongoing authentication of the user to access the user's private key released by the biometric authentication.

Another Aspect of the present invention captures a copy of the live face that was used to verify the user and using the user's private key digitally signs the photo and the selfie such that it the biometric data added to the verifiable credential is digitally signed in accordance with standards for digital signatures.

Another aspect of the present invention uses the user's private key released by the biometric authentication method to digitally sign a document, message or transaction in accordance with standards for digital signature that the credential owner and counter parties such as relying parties can trust because of the identity and credential verification provided by the invention.

Yet another aspect of the present invention is for the digitally signed photo, the digitally signed credentials and the digitally signed document and their corresponding digital signatures to be bound into a merged document which is digitally signed in the same manner described.

Yet another aspect of the present invention provides biometrics attributes such that when the document is received and opened the document will display the score or match between the user's face, and the user's face templates scored in the credential along with associated digital signatures of each and all components.

One of the most significant benefits of asymmetric keys is the ability to prove the source of a message or document which is known as a digital signature.

The present inventor has filed and received two patents referenced below regarding biometric control over private key as well as the use of biometrics for digitally signing documents by a user to provide evidence of the signer inside the document itself. The teachings of these patents focus on the user utilization and control over private keys for either authentication that can replace passwords and for signing digital documents.

U.S. Pat. No. 6,678,821 to Waugh et al., the contents of which are incorporated by reference herein, discloses an encryption/decryption system for providing restricted use of each key in a plurality of keys to preserve confidentiality of the plurality of keys. Each key is usable by an associated user in a public key infrastructure to encrypt and decrypt data. The encryption/decryption system comprises a key storage means for storing a plurality of keys, user authentication means for determining whether a prospective user of a key in the plurality of keys is the associated user of the key, and an encryption/decryption means for encrypting and decrypting data using the plurality of keys when the user authentication means authenticates the prospective user. The encryption/decryption means is operable in a browser on a client computer.

U.S. Pat. No. 11,080,384 to Ganong et al., the contents of which are incorporated by reference herein, discloses an encryption/decryption system to provide a means for user authentication and document authentication using face biometrics. The encryption/decryption system comprises a key storage means for storing a plurality of keys, a face authentication means for determining whether a prospective user of a key in the plurality of keys is the associated user of the key, an encryption/decryption means for encrypting and decrypting data using the plurality of keys when the face authentication means authenticates the prospective user, and a document authentication means that authenticates the user for access to their plurality of keys to digitally sign a document and display the users face used to authenticate access to their plurality of keys in or associated with the document acting as a witness to the signing of the document.

An example of a method where an issuer digitally signs using biometrics is a passport or mobile driver's license system. In these systems the issuer operates an applicant registration system that is manual and typically conducted face to face in a government office. These processes provide a high level of identity assurance but are costly to operate. Furthermore, these identity verification systems are designed for physical identity verification and not digital identity verification. A passport kiosk in an airport may be thought of as a system for physical identity verification and not for digital identity verification on the internet or mobile networks. However, identity industry companies are still using these government-issued photo IDs for identity verification for application such as KYC Know You Client for remote client enrollment, but without validation against a government photo ID database. Government collection of citizen biometrics is well within government authority, however the collection of citizen/consumer biometrics is an invasion of personal privacy and in many cases contravenes privacy legislation such as the Illinois Biometric Information Privacy Act enacted Oct. 3, 2008, in an effort to regulate the collection, use, and handling of biometric identifiers and information by private entities.

Public key cryptography is evolving from a centralized PKI structure to a decentralized system based on verifiable credentials and self sovereign agents or agents where they hold their verifiable credentials.
Per Wikipedia.

Verifiable credentials (VCs) are an open standard for digital credentials. They can represent information found in physical credentials, such as a passport or license, as well as new things that have no physical equivalent, such as ownership of a bank account. They have numerous advantages over physical credentials, most notably that they're digitally signed, which makes them tamper-resistant and instantaneously verifiable. Verifiable credentials can be issued by anyone, about anything, and can be presented to and verified by everyone. The entity that generates the credential is called the Issuer. The credential is then given to the Holder who stores it for later use. The Holder can then prove something about themselves by presenting their credentials to a Verifier.

Self-sovereign identity (SSI) is an approach to digital identity that gives individuals control of their digital identities.

SSI addresses the difficulty of establishing trust in an interaction. In order to be trusted, one party in an interaction will present credentials to the other parties, and those relying parties can verify that the credentials came from an issuer that they trust. In this way, the verifier's trust in the issuer is transferred to the credential holder. This basic structure of SSI with three participants is sometimes called "the trust triangle".

It is generally recognized that for an identity system to be self-sovereign, users control the verifiable credentials that they hold and their consent is required to use those credentials. This reduces the unintended sharing of users' personal data. This is contrasted with the centralized identity paradigm where identity is provided by some outside entity.

W3C Verifiable Credentials and Self Sovereign Agents provide the security and privacy layer that is missing today and is what is becoming known as Trust Over IP. However verifiable credentials and the agents that protect them are only as good as the password that protects access to a user's private key.

As reported in the Naked Security by Sophos article "How long would it take to crack your password?", "One of the other major issues we have observed is that people have great difficulty remembering more complex passwords than the six or eight alphabetic strings that most Internet users rely on. Because of this, they fall back on an eight digit passphrase that is usually a family member's name or place of birth, and which—unfortunately—are all too easy to hack using brute force password attacks."

To measure the strength of a password, http://www.passfault.com/, a password strength password generator, was created. Using this tool it will be noted that a standard password, based on typical strength guidance, an 8 character password consisting of numbers, letters and characters, can be cracked in under a day. Which is why the Carnegie-Mellon's 2011 study (PDF) concluded that password length was the only thing that really influences password strength. The flaw being that the normal human cannot remember a long and random password.

Face biometrics can replace a password. Unlike a password, a real face cannot be written down, lost, forgotten, shared or stolen. Face biometrics offers significant additional benefits compared to other authentication methods such as:

Something you Know: passwords: random challenge question and images,
Something you Own: smart card, dongles, one time password fobs, out of band to phone,
Something you Are: iris, fingerprints, voice, heartbeat However, passwords are the single biggest cyber security flaw. People forget them, lose them, write them down, share them, sell them and have them stolen. Face authentication solves the password problem for the users and their agents. It also solves authentication issues for credentials issuers and relying parties.

The development of verifiable credentials and self-sovereign agents was built on the assumption that the underlying public key cryptography and password control over private keys was sufficient security for protecting agents and credentials. However, like the many cases where crypto currency is stolen because of stolen passwords and the underlying private keys, verifiable credentials and self-sovereign agents face the same issue. The invention is a compliment to the emerging verifiable credentials and self-sovereign technologies and brings an additional level of trust, privacy and security for agents that hold credentials, the credentials themselves and for the credentials issuer and relying parties.

The present invention provides a method for identifying a user associated with an electronic document or verifiable credential that authenticates the document or verifiable credential and authenticates the user and their credentials using the user's face that, employing face biometrics, was used to authenticate the user to access their private key to decrypt a documents or verifiable credential with such documents or verifiable credential appended with face biometrics of the user and prove ownership of the credential by scoring the match between the appended biometrics with the face that was used to decrypt the credential and presenting the match score to a relying party.

Described herein are processes for verifying an applicant's identity for a document or credential issuance system where face biometrics is performed by the user of a user terminal that executes a user's agent that includes face recognition software. To apply for a credential and verify an applicant a user will use a user terminal device such as a smartphone, a computer or similar device that enables the user's agent and permits capture of digital images by an image capture device and the scanning, perhaps also by the image capture device, of a user identity document such as a driver's license. The user terminal can be controlled by the user to capture at least one image of the user (a selfie) and the face recognition application will render a face recognition code or "template" for each of the faces in the photoID and the selfie and will then determine the extent to which these templates match, so as to score the two face templates against each other thereby to generate one or more recognition score(s). The recognition score(s) can then be sent to the issuer system, such as a credential issuer, that will inspect the recognition score(s) and determine if they meet or exceed a threshold score(s) to decide to confirm identity and proceed to issue a credential bound to the identity.

To provide a higher level of verification and if the issuer system has access to the source photo such as a drivers license database from which the photoID was created issuer system may, using the face recognition software executing on the issuer system, generate a face template from the photo in the database and send the face template to the user's agent on the user terminal. The face recognition software executing on the user terminal, which can be a component of or separate from the user's agent, will then compare and generate at least one recognition score using the face template rendered from the database photo against the face template rendered from the photoID and from the selfie and then send the resulting recognition score(s) to the issuer system. The issuer system will then inspect the scores to determine a verification pass or fail by determining if the recognition score(s) meet or exceed a threshold score(s), and decide whether to issue a verifiable document, such as a verifiable credential. This approach ensures that face recognition is done privately within the user's full control on their user terminal with no transfer of private identifying information such as photos of the user. As will be noted the face recognition application executing on the user terminal and the face recognition application on the issuer system conduct the same face recognition process and may be the same face recognition application.

Another approach that reduces the need for server side processing (such as by an issuer system) is for the server to send the database photo to the users agent on the user terminal for further processing. An alternative approach is for the photos and selfie photo to be transferred to the issuer system for face recognition processing. The process of verifying a user against a photoID and in the very near future a government issued digital ID can be processed entirely on the user terminal, on the issuer terminal, or as a hybrid solution where processing is shared between the user agent and the issuer system, for verifying an applicant's identity It will be appreciated that a user's photo id such as a drivers license can be digitally signed, encrypted and stored securely by the face recognition application on the user terminal for use for future identity verification.

The photo id document may be digitally signed using the users private key, such as for example in accordance with PKCS #1 RSA Cryptography Standard Digital Signature or emerging verifiable credentials standards. PDF Portable Document Format Standards or FIDO Fast Identity Online, or MobileConnect which use asymmetric encryption techniques. In all of these protocols/systems, according to the present description, the biometrics are embedded in the document or credential. In the case of FIDO or MobileConnect for example the biometric identifier embedded in the user's credential that holds the user's public key allows the system owner to request the user re-authenticate against the biometrics stored inside the credential that was created in the original enrollment process. For example when a user signs a document or authenticates (using biometrics rather than a password) using private keys such as provided by SSI wallets, Fido clients, Mobile Connect clients or PKI certificates, the authentication or signing process is automated and invisible. To reassure the party that is relying on the biometrics for authentication the relying party can request the user to re-authenticate against the embedded biometrics. This is similar to how a smart phone forces the user to authenticate with their PIN to reinforce the security and reliability of the cell phone biometrics. The reason for this is cell phone biometrics trade-off security for ease of use by the user. The relying party can therefore require periodic re-authentication by the user by asking the user to take a selfie thus providing evidence that the users agent is under the control of the user. This approach is simpler and easier than forcing the user to re-verify their identity.

FIG. 1 is a basic network diagram showing cryptographic communications sessions over communication channels of a network 2000 between computing devices for the purpose of securely exchanging information such as verifiable credentials and other documents. The computing devices interacting in respective cryptographic communications sessions including a user terminal UT, an issuer system IS, and a verifier system VS. Each of UT, IS and VS are, in this description, third parties with respect to one another. It will be appreciated that additional user terminals, issuer systems, and verifier systems may be part of a system that includes UT, IS, and VS as shown.

Figure 2:
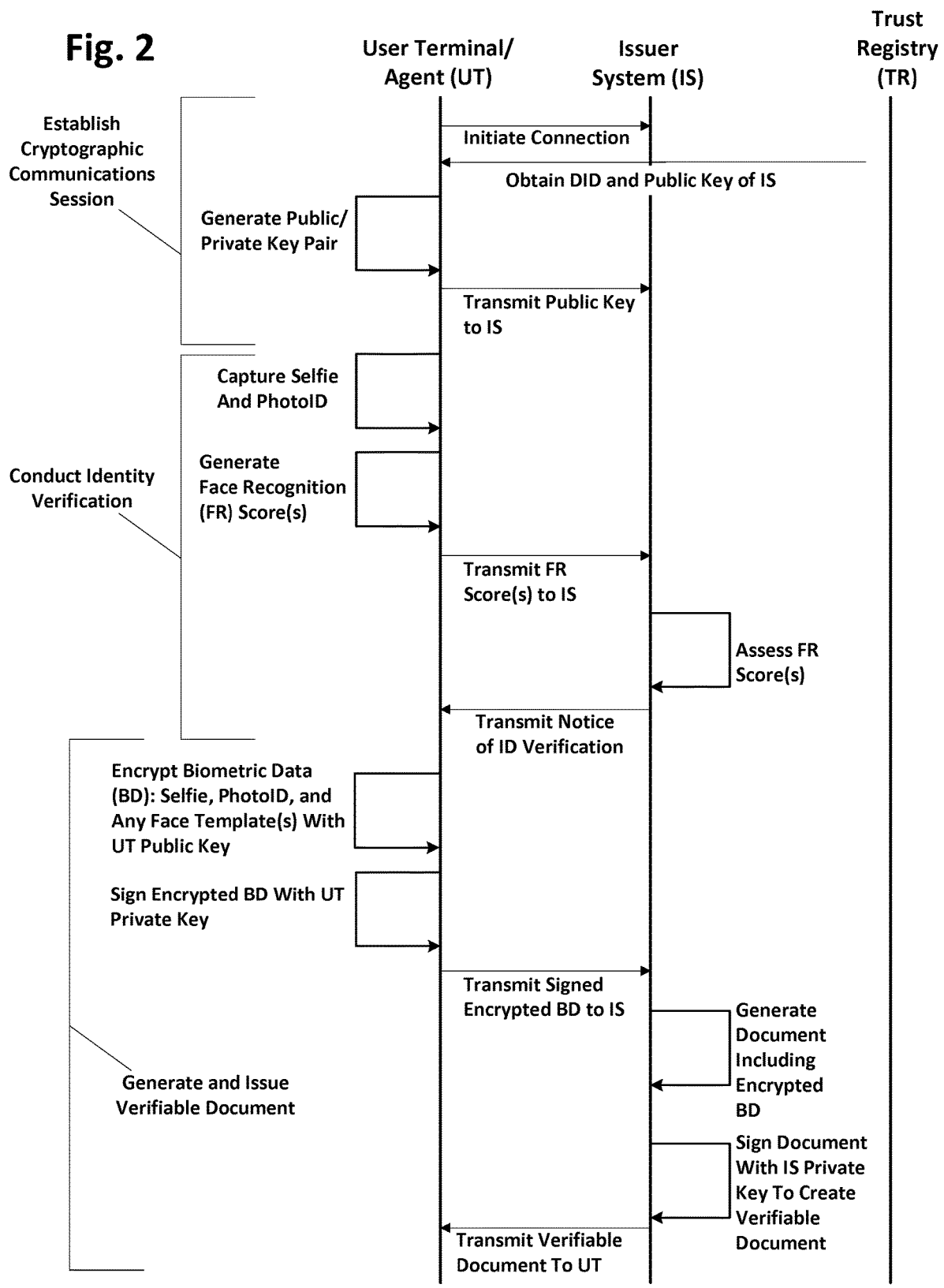
FIG. 2 is a diagram outlining an interactive process undertaken by a user terminal and an issuer system during issuance of a new verifiable document.

FIG. 2 is a diagram outlining an interactive process 50 undertaken by a user terminal (UT) and an issuer system (IS) during issuance of a new verifiable document. The verifiable document may be a verifiable credential, or may be any other document that is intended to be used or wielded by a particular individual to which the document pertains, such as a PKI certificate, a Fido account, or a mobile connect account. An individual using the UT may wish to apply for and be issued a verifiable document using process 50 so that the individual may receive and thereafter wield the verifiable document during interactions with other systems and/or people thereby to prove something verifiable about the individual.

An initial stage of process 50 includes establishing a cryptographic communications session over a communication channel between the UT and the IS.

The establishing of the cryptographic communications session may be done using a number of known techniques. In this embodiment, during the establishing of the cryptographic communications session, a user agent of the UT, under control of a user of the UT, initiates a network connection with the IS. The UT obtains a Decentralized Digital Identity (DID) for the IS from a trust registry (TR)

with which the DID is registered, and obtains a public key for the IS. The UT then generates a public/private key pair for the cryptographic communications session with the IS, and transmits the public key to the IS for use during the session. The UT and IS thereby have each others' public keys for the purpose of cryptographic communications during the session.

It will be appreciated that a trust registry can be operated in one of several ways. For example, a trust registry can be operated according to Lightweight Directory Access Protocol (LDAP) where PKI certificates or SSL/TSL certificates may be stored. In this embodiment, Trust Registry TR is where organizations, such as credential issuers or other ISs, register their DIDs and that user agents of UTs can use to look up and obtain the organizations' DID and public key. It will also be appreciated that there are a variety of methods for finding and acquiring credentials and public keys. In this embodiment, what is described is a basic known method underlying DIDs and DID-based Communication, known as DIDComm. The user agent of the UT uses the DID and the public key of the IS (which may be a credential issuer or other issuer system) to authenticate the IS and to establish secure communications between the UT and the IS. After this, the user agent may generates a DID and the public key and private key pair referred to above so that the UT can send the public key to the IS to establish trust between the UT and the IS. This facilitates the exchange of identity information and receipt of verifiable credentials or other verifiable documents. It will be appreciated that mutual authentication with public and private key pairs created for such user agents to communicate is described by Phil Windleyin a publication entitled The Self-Sovereign Internet that may be found at https://www.windley.com/archives/2021/06/the_self-sovereign_internet.shtml.

With the cryptographic communications session having been established, process 50 continues to a stage of conducting identity verification for the purpose of generating and issuing the verifiable document applying for a verifiable document. During the identify verification stage of the session, in this embodiment, the UT captures biometric data about the user of the UT in the form of at least one selfie image captured of the user of the UT using an image capture device, such as a camera, under control of, or integrated with, the UT. The UT also captures photoID data using the image capture device. In this embodiment, at least the selfie image captured of the user of the UT is captured using liveness detection, so that the UT can determine whether the at least one selfie image is of a live person, as distinct from a previously-captured photo of a person. Using liveness detection may be useful for assuring the UT and/or the IS that the UT has captured a selfie image of the user controlling the UT, and not an image of an already-captured photo.

With the at least one selfie image and the photoID data having been captured, in this embodiment the UT generates at least one face recognition score generated based on a comparison between biometric data from the at least one selfie image and the photoID data. In this embodiment, to generate the at least one face recognition score, face templates are compared to each other and the level of similarity between them is scored.

A first face template may be generated based on the at least one selfie image using a facial recognition process, and a second face template is generated based on the photoID data. A second face template may be generated directly from a photo that is embodied in the photoID itself, or may be generated based on a photo corresponding to the photoID that is stored in an official database. For example, if the photoID is a physical driver's license card carrying a photo of the individual, this photo of the individual may itself be processed to generate the second face template. Alternatively, the photoID may be processed for other unique information that can be used securely as an index to a corresponding, higher-quality photo of the individual to whom the photoID pertains stored remotely in an official photo database, and the higher-quality photo may be retrieved and itself processed to produce the second face template. In embodiments, the second face template is generated from the photo being carried by the photoID, and a third face template may be generated based on the higher-quality photo of the individual retrieved from the official photo database. Alternatives are possible. For example, if the photoID is a digital photoID electronically stored on or securely accessible to the UT, the digital photoID may be processed to generate a second face template and/or may be processed to collect information for accessing the official photo database to collect the associated higher-quality photo to produce the second template or to produce the third template.

Various facial recognition processes for processing image features in digital image pixels and relationships between such image features to recognize a unique face in an image and to produce a mathematical representation or model of the unique face in the form of a face template unique to the individual whose face is being processed may be employed. Various facial recognition processes suitable for this purpose are known and will not be described further herein. The facial recognition process used at this stage does not have to identify the person, but simply produce a face template for the face being processed. It is preferred for the sake of privacy and efficiency that such a facial recognition process be operable locally at the UT, but alternative approaches may be used.

With at least the first and second face templates having been generated, they may be compared with each other using a mathematical process to produce a numerical score as to their similarity. This numerical score may be referred to as a recognition score. In embodiments, if a third template has been generated, then a first recognition score may be generated based on a comparison between the first template and the second template, a second recognition score may be generated based on a comparison between the first template and the third template, and a third recognition score may be generated based on a comparison between the second template and the third template.

With the face recognition (FR) score(s) having been generated, they may be securely transmitted to the IS. At the IS, the FR score(s) are assessed to determine whether they meet or exceed a threshold score. The threshold score may be established by the IS based on a balance between ease of use, necessary security levels required for the verifiable document, or may be based on protocol or convention. In the event that the FR score(s) is (are) deemed to meet or exceed the threshold score, then the IS transmits a notice of identify verification to the UT.

With the identity verification stage of process 50 having been completed, process 50 may proceed to the stage of generating and issuing a new verifiable document.

During this stage, the UT collects a set of biometric data (hereinafter referred to interchangeable as BD). In this embodiment, this BD includes the first face template generated from the selfie image, the second face template generated from the photoID or the higher quality corresponding image retrieved from the official photo database, and optionally the third template as described above if the third template has been generated and used to produce recognition scores. Optionally, the actual images used to generate the face templates used in the generation of the face recognition score(s) are included in the BD.

This BD is then encrypted by the UT using the public key of the UT, to produce $E_{UTpub}(BD)$, where $E_{UTpub}(x)$ refers to the encryption (E) of 'x' using the public key of the UT. Encryption of the BD using the public key of the UT ensures that only those with access to the corresponding private key, such as the UT itself, can decrypt $E_{UTpub}(BD)$ to gain access to the BD.

The UT then digitally-signs $E_{UTpub}(BD)$ with the private key of UT to produce $S_{UTpriv}(E_{UTpub}(BD))$, where $S_{UTpriv}(x)$ refers to the signing (E) of 'x' using the private key of the UT. In this embodiment, digital signing conducted in accordance with a standards such as PKCS #1, RSA Cryptography Standard Digital Signature, PDF Portable Document Format Standards, authentication standards such as FIDO or Mobile Connect, or another suitable standard such as a suitable emerging verifiable credential standard.

For securely transmitting $S_{UTpriv}(E_{UTpub}(BD))$ to the IS over the cryptographic communications channel, the UT then encrypts $S_{UTpriv}(E_{UTpub}(BD))$ using the issuer system's public key to create $E_{ISpub}(S_{UTpriv}(E_{UTpub}(BD)))$, where $E_{ISpub}(x)$ refers to the encryption of 'x' using the public key of the IS. The UT then transmits $E_{ISpub}(S_{UTpriv}(E_{UTpub}(BD)))$ to the IS over the cryptographic communications channel.

The IS receives and decrypts $E_{ISpub}(S_{UTpriv}(E_{UTpub}(BD)))$ using the private key of the IS, to gain access to $S_{UTpriv}(E_{UTpub}(BD))$. The IS validates that $S_{UTpriv}(E_{UTpub}(BD))$ has indeed been digitally signed by the UT by confirming the cryptographic hash of $E_{UTpub}(BD)$ using the public key of UT corresponds to the digital signature applied to $E_{UTpub}(BD)$ by the UT.

The IS then generates a new document DOC that includes at least a content component and the encrypted biometric component, in particular $S_{UTpriv}(E_{UTpub}(BD))$. The encrypted biometric component $S_{UTpriv}(E_{UTpub}(BD))$ may be appended to the content component or may otherwise be combined in the new document DOC with the content component. In this description, any such combination is referred to herein as DOC=[Content Component][Encrypted Biometric Component]. The data/information in the content component itself will depend on the nature of the verifiable document being generated and issued by the IS. For example, if the verifiable document to be issued by the IS will be a verifiable credential, the content component will include data/information pertaining to the credential itself. For example, if the credential is a professional designation, then data/information pertaining to that professional designation, such as the name of the credential issuer, dates, and other professional credential-related data/information may be part of the content component.

With the new document DOC having been created to include the content component and the encrypted biometric component, the IS then digitally signs the new DOC using the private key of the IS to create a digitally-signed, and thus verifiable, document $S_{ISpriv}(DOC)$, where $S_{ISpriv}(x)$ refers to the signing (E) of 'x' using the private key of the IS. For secure transmission to the UT, this verifiable document $S_{ISpriv}(DOC)$ is then encrypted by the IS using the public key of the UT, to create $E_{UTpub}(S_{ISpriv}(DOC))$, where $E_{UTpub}(x)$ refers to the encryption of 'x' using the public key of the UT.

This signed and encrypted document $E_{UTpub}(S_{ISpriv}(DOC))$ is then transmitted to the UT for decryption using the private key of the UT, so that $S_{ISpriv}(DOC)$ may be stored locally or elsewhere, optionally re-encrypted using the private key of the UT, for future use.

It will be noted that if the original credential is a verifiable credential, the user does not have to scan his government issued ID but can simply call up the verifiable credential, decrypt the BP for that using his private key, authenticate his face against the decrypted BP to confirm he can "use" the existing verifiable credential for producing a new verifiable credential, and then proceed accordingly as above.

Figure 3:
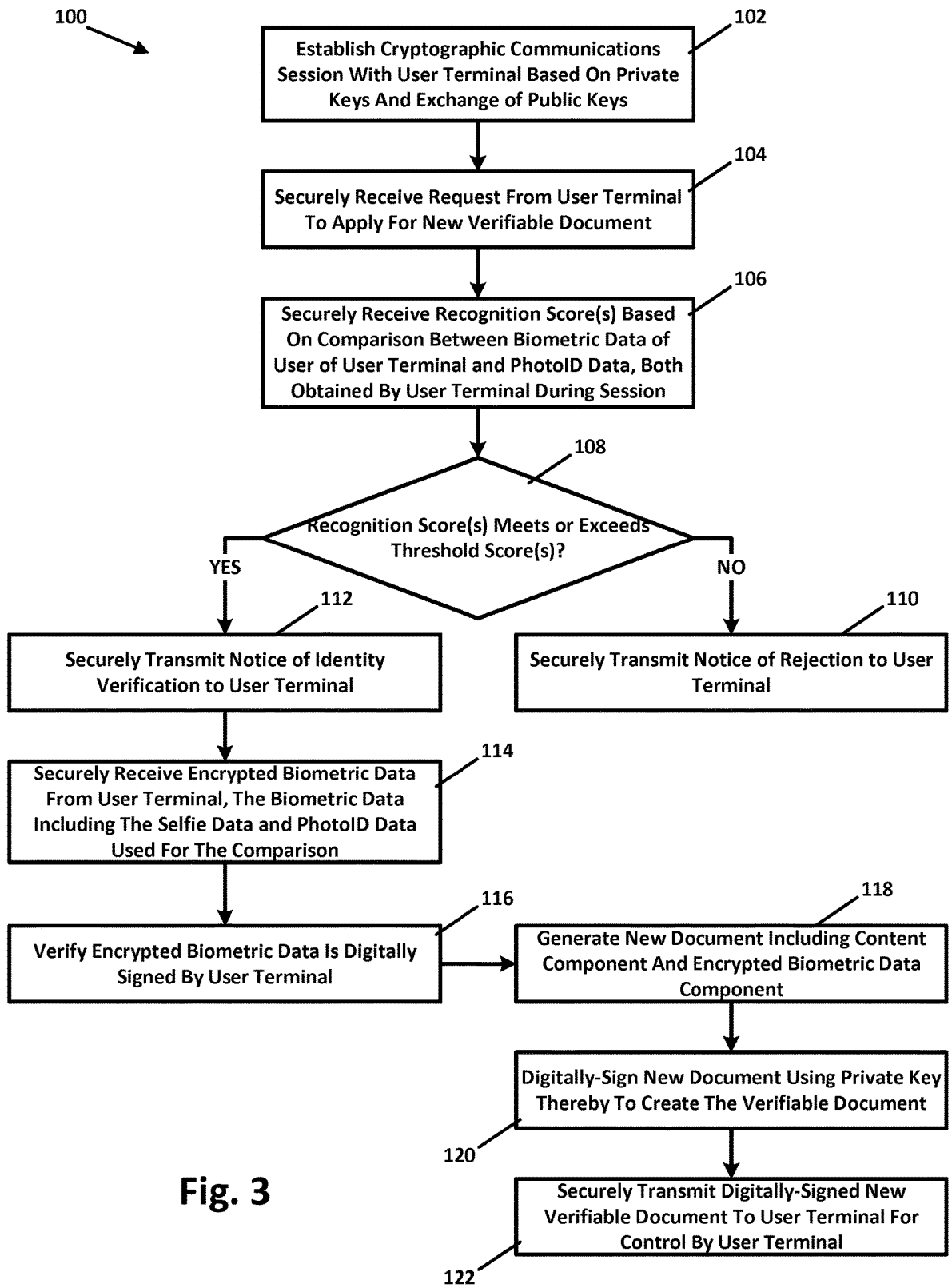
FIG. 3 is a flowchart showing steps in a method conducted by an issuer system for issuing a new verifiable document to a user terminal, in accordance with the process of FIG. 2.

FIG. 3 is a flowchart showing steps in a method 100 conducted by an issuer system for issuing a new verifiable document to a user terminal, in accordance with process 50 described above. It will be appreciated that the following sets forth method 100 from the perspective of the issuer system.

Initially, a cryptographic communications session with the user terminal over a communication network based on private keys and exchange of public keys is established (step 102). A request from the user terminal for a new verifiable document is securely received over the communication network (step 104). An identity of a user of the user terminal based on a comparison of data from at least one image captured of the user (a "selfie" image) and photoID obtained during the session by the user terminal is then verified. In this embodiment, verifying the identity of the user of the user terminal includes receiving at least one recognition score generated based on a comparison between biometric data from the at least one image captured of the user during the session by the user terminal and the photoID data also captured during the session (step 106). The comparison may occur at the user terminal. In the event that the recognition score(s) do not meet or exceed a threshold score(s) (step 108), a notice of rejection is securely transmitted to the user terminal (step 110). On the other hand, in the event that the recognition score(s) do meet or exceed the threshold score(s) (step 108), then a notice of identity verification is securely transmitted to the user terminal (step 112).

Encrypted biometric data is then securely received from the user terminal (step 114). The biometric data is expected to include the selfie data and the photoID that was used for the comparison to generate the recognition score(s). With the encrypted biometric data having been securely received, the encrypted biometric data is verified as having been digitally signed by the user terminal (step 116). A new document is then generated (step 118), with the document including a content component and a component containing the encrypted biometric data (or, the encrypted biometric data component). This new document is then digitally-signed using the private key of the issuer system (step 120) thereby to create the new verifiable document, which is then securely transmitted over the communication channel to the user terminal (step 122) for use and/or control from the user terminal.

In embodiments, face recognition can be conducted entirely by the user agent at the UT, entirely by the IS, partly by each where processing is shared between the UT and the IS. It will be appreciated, however, that which ever approach is implemented, the IS digitally-signing the verifiable document containing the encrypted biometric data component acts as evidence that the IS had been involved in an identity verification process that resulted in the binding of the identity of the individual to whom the verifiable document and/or credentials pertain so that the individual can later prove ownership and control.

It will be appreciated that privacy of a user's biometric data is an important consideration. For example, government-issued IDs normally include a photo of the user such as for example passports, driver's license and health cards. Employee identity cards such as a PIV (Personal Identity Verification) card and a CAC (Common Access Card) include a photo.

In future, such identity documents will eventually be augmented with software versions, such as the MDV Mobile Drivers license, for digital use. Photos are useful for physical identity verification by another person. Furthermore, passports often include integrated circuits for storage of a digitally signed and encrypted version of the photo printed on the passport. Capture of the photo is done manually as part of the application process such as applying for a driver's license or passports. Governments will also be issuing digital IDs as evidence of citizenship or the province or state that the person resides and are likely to include the photo of the individual to whom a given digital ID pertains, for the sake of physical identity verification. In the digital world, digital IDs will be used by relying parties as described herein but without the need to scan using an image capture device of a user terminal or other computer terminal. Rather, scanning may be replaced by processing the digital ID document to extract the photo, which photo can then be subjected to process of identity verification described herein, for example involving a user capturing a selfie and having the selfie compared, using processes described herein, to the photo extracted from the digital ID and/or a face template that is already part of the digital ID.

While it is appropriate for government to capture photos of people it is not appropriate for businesses and consumers to do so. In the physical world it is the photo ID that acts as the evidence required to conduct business affairs such as the simple opening of a bank account or applying for life insurance. The digital identity verification process using digital IDs will follow the same process to bind the identity of the credential owner to the credential itself, or otherwise bind the identity of an individual with a verifiable document pertaining to the individual. With methods described herein a credential issuer or other issuer system can bind biometrics without the need to physically see the person to issue a credential or other verifiable document and without the need to store biometrics while at the same time providing assurance to the credential owner that the document or credential cannot be used by an imposter, even if the imposter has accessed a private key, to steal or wield their credentials or verifiable documents and consequently steal or wield their identity.

In embodiments, a captured image of a photoID, such as a driver's license, obtained as described herein for identity verification may thereafter be securely stored for subsequent identity verification, obviating the need to subsequently actually physically scan the physical photoID again during the subsequent identity verification. Such a captured image may be digitally signed, encrypted and stored securely on the UT or elsewhere by an application executing on the UT, such as a face recognition application used to generate face templates and conduct comparisons and face recognition scoring, or another application or user agent executing on the UT. Once securely stored it can be later retrieved for subsequent identity verification.

Figure 4:
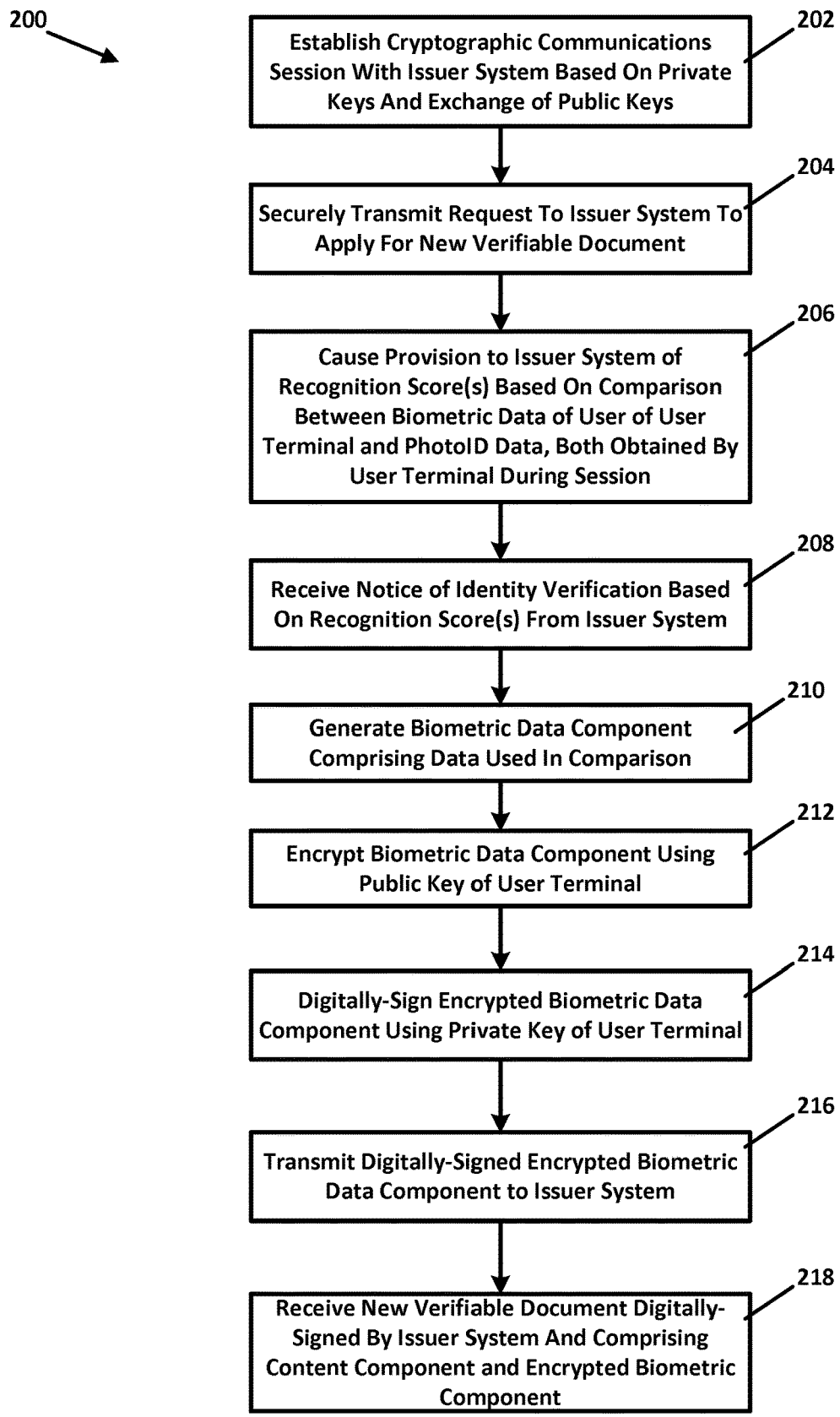
FIG. 4 is a flowchart showing steps in a method conducted by a user terminal for obtaining a new verifiable document from an issuer system, in accordance with the process of FIG. 2.

FIG. 4 is a flowchart showing steps in a method 200 conducted by a user terminal for obtaining a new verifiable document from an issuer system, in accordance with process 50 described above. It will be appreciated that the following sets forth method 200 from the perspective of the user terminal.

Initially, a cryptographic communications session with the issuer system over a communication network based on private keys and exchange of public keys is established (step 202). A request to apply for a new verifiable document, such as a verifiable credential, is securely transmitted to the issuer system over the communication network (step 204). The user terminal then causes to be provided to the issuer system one or more recognition scores that are based on a comparison between biometric data of the user of the user terminal and photoID data, both obtained by the user terminal during the session (step 206). The comparison may be conducted at the user terminal, but may alternatively be conducted at least partly by the issuer system pursuant to the secure transmission of the biometric data of the user and the photoID data. In this embodiment, the biometric data is facial biometric data, generated for example based on the selfie captured during the session by the user terminal as described herein, and generated based on the photoID data as described herein.

After the issuer system has assessed the recognition score(s), the user terminal may receive a notice of identity verification from the user terminal (step 208). Responsive to the notice of identity verification, a biometric data component comprising biometric data used in the comparison is generated (step 210). This biometric data component is then encrypted by the user terminal using the public key of the user terminal, thereby to generate an encrypted biometric data component (step 212). The encrypted biometric data component is then digitally-signed using the private key of the user terminal, thereby to generate a signed, encrypted biometric data component (step 214). This signed, encrypted biometric data component is then transmitted securely, as described herein, to the issuer system (step 216). Pursuant to this, and pursuant to steps taken by the issuer system to use the encrypted biometric data component to create a new verifiable document, as described above, the user terminal securely receives the new verifiable document from the issuer system, with the new verifiable document having been signed by the issuer system using its private key and including a content component and the encrypted biometric component that had been transmitted by the user terminal to the issuer system (step 218).

A verifiable document, such as a verifiable credential, generated as described herein, may be validly presented, wielded, accessed or otherwise used only by the individual to whom the verifiable document pertains. This is because the verifiable document described herein, digitally signed by an authorized issuer system such as a credential issuer such that it may be validated as a valid document, contains within its contents encrypted biometric data pertaining to the individual him or herself. A user wishing to present, wield, or otherwise use the verifiable document according to embodiments described herein can be required to authenticate against the biometric content bound within the verifiable document itself at the time of its attempted use. While an unauthorized user may have access to a private key of an individual to whom the verifiable document pertains, such that the unauthorized user may be able to decrypt the biometric data that is contained in the encrypted biometric data component of the verifiable document, such an unauthorized user will not be able to authenticate him or herself against the biometric data itself. A process for providing verification of valid use of the verifiable document may verify the verifiable document as having been validly signed by an appropriate issuer system, but such a process will also proceed to compare the unauthorized user's own biometric data, such as that gleaned from a selfie at the time of attempted use, and will determine that it is not sufficiently comparable to the biometric data component itself. The process may therefore refuse presentation, wielding, or other use of the verifiable document at the time of identity verification of the user. Binding the biometrics themselves with the verifiable document in the manner described herein provides a significant security and privacy advantage particularly in contexts in which private keys may be vulnerable to misappropriation by unauthorized users, over systems and processes that assume the user of a private key is authorized to do so.

Figure 5:
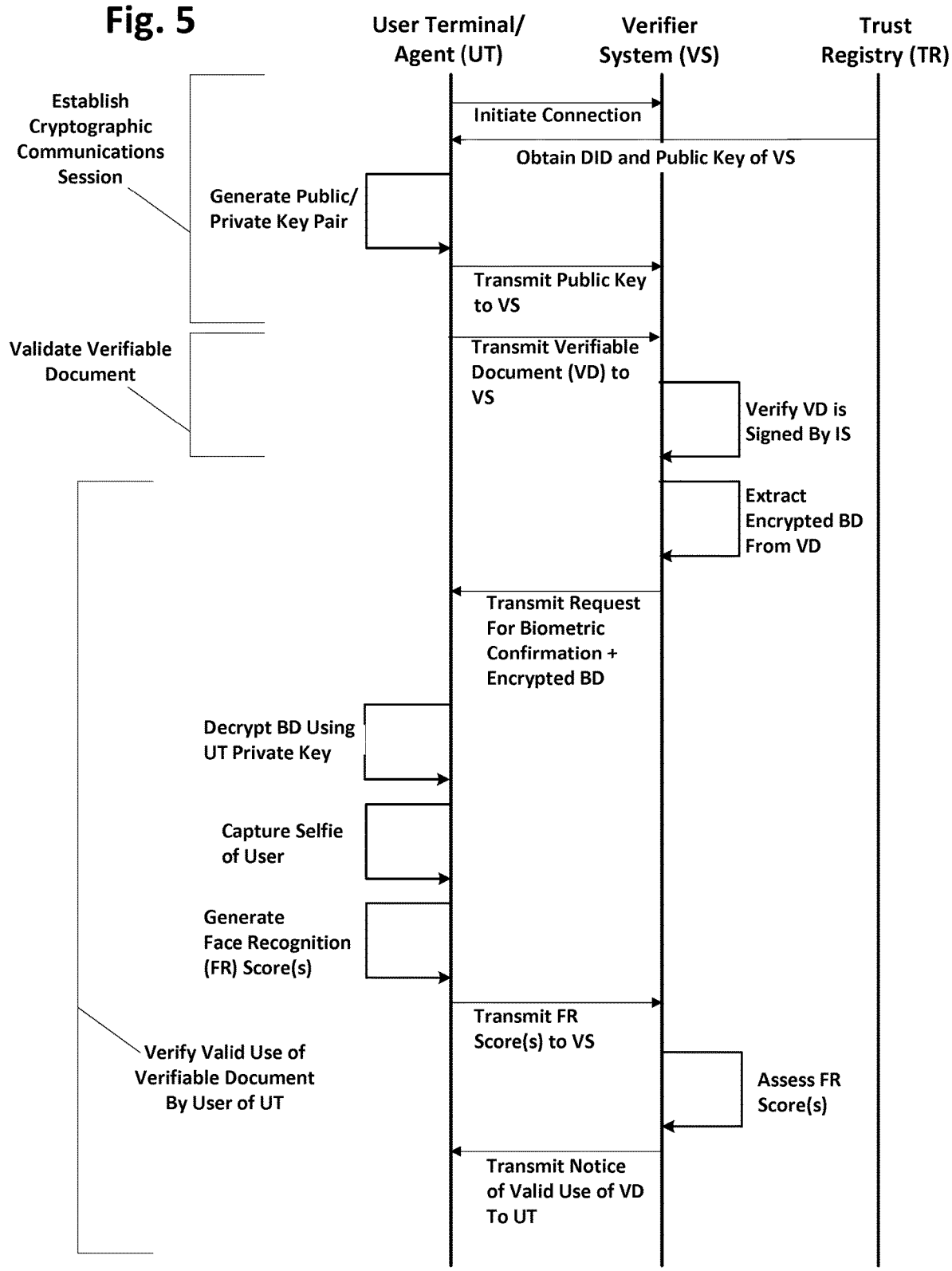
FIG. 5 is a diagram outlining an interactive process undertaken by a user terminal and a verifier system during verification of valid use of a verifiable document.

FIG. 5 is a diagram outlining an interactive process 350 undertaken by a user terminal (UT) and a verifier system (VS) during verification of valid use of a verifiable document. The verifiable document may be a verifiable credential, or may be any other document that is intended to be used or wielded by a particular individual to which the document pertains, such as a PKI certificate, a Fido account, or a mobile connect account. An individual using the UT may wish to wield the verifiable document to prove something verifiable about the individual.

An initial stage of process 350 includes establishing a cryptographic communications session over a communication channel between the UT and the VS.

The establishing of the cryptographic communications session may be done using a number of known techniques. In this embodiment, during the establishing of the cryptographic communications session, a user agent of the UT, under control of a user of the UT, initiates a network connection with the VS. The UT obtains a Decentralized Digital Identity (DID) for the VS from a trust registry (TR) with which the DID is registered, and obtains a public key for the VS. The UT then generates a public/private key pair for the cryptographic communications session with the VS, and transmits the public key to the VS for use during the session. The UT and VS thereby have each others' public keys for the purpose of cryptographic communications during the session.

It will be appreciated that a trust registry can be operated in one of several ways. In this embodiment, the user agent of the UT uses the DID and the public key of the VS (which may be a credential verifier or other verifier system) to authenticate the VS and to establish secure communications between the UT and the VS. After this, the user agent may generates a DID and the public key and private key pair referred to above so that the UT can send the public key to the VS to establish trust between the UT and the VS. This facilitates the exchange of identity information and receipt of verifiable credentials or other verifiable documents.

With the cryptographic communications session having been established, process 350 continues to a stage of conducting validation of a verifiable document for the purpose of proving something about the user of the UT wielding the verifiable document, or to otherwise enable the user of the UT to use the verifiable document for some purpose. During the validation stage of the session, in this embodiment, the UT securely transmits a verifiable document VD to the VS. As described above, in this description the VD itself has the form of $S_{ISpriv}(DOC)$, where $S_{ISpriv}(x)$ refers to the signing (S) of 'x' using the private key of an issuer system (IS), such as a credential issuer system. $S_{ISpriv}(DOC)$ may be stored in privately encrypted form on the UT, or in another location accessible to the UT, and then decrypted for access and re-encrypted using the public key of the VS.

Furthermore, as described above. DOC contains a content component and an encrypted biometric component, in particular $S_{UTpriv}(E_{UTpub}(BD))$, where $S_{UTpriv}(x)$ refers to the signing of 'x' using the private key of the UT, and $E_{UTpub}(x)$ refers to the encryption of 'x' using the public key of the UT.

What is transmitted to the VS by the UT at this time is the VD encrypted by the UT using the public key of the VS, or $E_{VSpub}(S_{ISpriv}(DOC))$, where $E_{VSpub}(x)$ refers to the encryption of 'x' using the public key of the VS.

The VS receives $E_{VSpub}(S_{ISpriv}(DOC))$, and decrypts what it receives using the private key of the VS, to obtain $S_{ISpriv}(DOC)$. The VS then verifies that DOC was digitally signed using the private key of the IS. Once the verifiable document has been so verified, the process 350 advances to a stage in which the use itself of the verifiable document $S_{ISpriv}(DOC)$ by the user of the UT can be validated.

As discussed above, the encrypted biometric data component of DOC is $S_{UTpriv}(E_{UTpub}(BD))$. The VS transmits a request to the UT for biometric confirmation, and accompanies the request with the encrypted biometric component $S_{UTpriv}(E_{UTpub}(BD))$. The UT receives the encrypted biometric component and decrypts it using the private key of the UT, thereby to access BD.

The UT then captures biometric data about the user of the UT in the form of at least one selfie image captured of the user of the UT using an image capture device, such as a camera, under control of, or integrated with, the UT. In this embodiment, at least the selfie image captured of the user of the UT is captured using liveness detection, so that the UT can determine whether the at least one selfie image is of a live person, as distinct from a previously-captured photo of a person. Using liveness detection may be useful for assuring the UT and/or the VS that the UT has captured a selfie image of the user controlling the UT, and not an image of an already-captured photo.

With the at least one selfie image having been captured, in this embodiment the UT generates at least one face recognition score generated based on a comparison between biometric data from the at least one selfie image and the BD extracted from the encrypted biometric data component of the VD transmitted by the VS. In this embodiment, to generate the at least one face recognition score, face templates are compared to each other and the level of similarity between them is scored.

A first face template may be generated based on the at least one selfie image using a facial recognition process, and at least a second face template is generated based on the BD. A second face template may be generated from a photo in the BD, or may itself already be part of the BD, depending on how the original BD was created during initial creation of the VD. A third face template may be generated from another photo in the BD, or may itself already be part of the BD, depending on how the original BD was created during the initial creation of the VD. Alternatives are possible.

Various facial recognition processes for processing image features in digital image pixels and relationships between such image features to recognize a unique face in an image and to produce a mathematical representation or model of the unique face in the form of a face template unique to the individual whose face is being processed may be employed. Various facial recognition processes suitable for this purpose are known and will not be described further herein. It is preferred for the sake of privacy and efficiency that such a facial recognition process be operable locally at the UT, but alternative approaches may be used.

With at least the first and second face templates having been generated, they may be compared with each other using a mathematical process to produce a numerical score as to their similarity. This numerical score may be referred to as a recognition score. In embodiments, if a third template has been generated or is part of the BD, then a first recognition score may be generated based on a comparison between the first template and the second template, a second recognition score may be generated based on a comparison between the first template and the third template, and a third recognition score may be generated based on a comparison between the second template and the third template.

With the face recognition (FR) score(s) having been generated, they may be securely transmitted to the VS. At the VS, the FR score(s) are assessed to determine whether they meet or exceed a threshold score. The threshold score may be established by the VS based on a balance between ease of use, necessary security levels required for the verifiable document, or may be based on protocol or convention. In the event that the FR score(s) is (are) deemed to meet or exceed the threshold score, then the VS transmits a notice of valid use of the VD by the user of the UT.

It will be appreciated that, in the present description, when a person attempts to wields a verifiable credential, the VS can verify first that the verifiable credential was issued by an authorized credential issuer by checking that a valid credential issuer digitally signed the verifiable credential. Once the VS is satisfied that it is indeed itself a verified credential, the VS now can determine whether the user wielding that verified credential is the individual to whom the credential itself uniquely pertains. This requires the user wielding the verified credential to receive and decrypt the encrypted biometric data component of the verified credential. If the user can decrypt the encrypted biometric data component portion, this means the individual is in possession of the appropriate private key, but this only gives the user access to the biometric profile. In order to satisfy the VS that the user wielding the verified credential is in fact the individual whose biometric data is bound to the verified credential, the user wielding the credential is required to take a selfie, and the selfie is processed along with the biometric data to determine a recognition score(s) between the selfie and that which is in the biometric data. The recognition score is then sent to the VS for assessment. If the VS system is satisfied the recognition score(s) meet or exceed a threshold level(s), the VS can accept the valid credential as well as the fact that it is being wielded by the individual to whom the credential pertains. Otherwise, the VS is entitled to consider that the credential, although itself valid, is not being wielded by the individual to whom the credential pertains.

Figure 6:
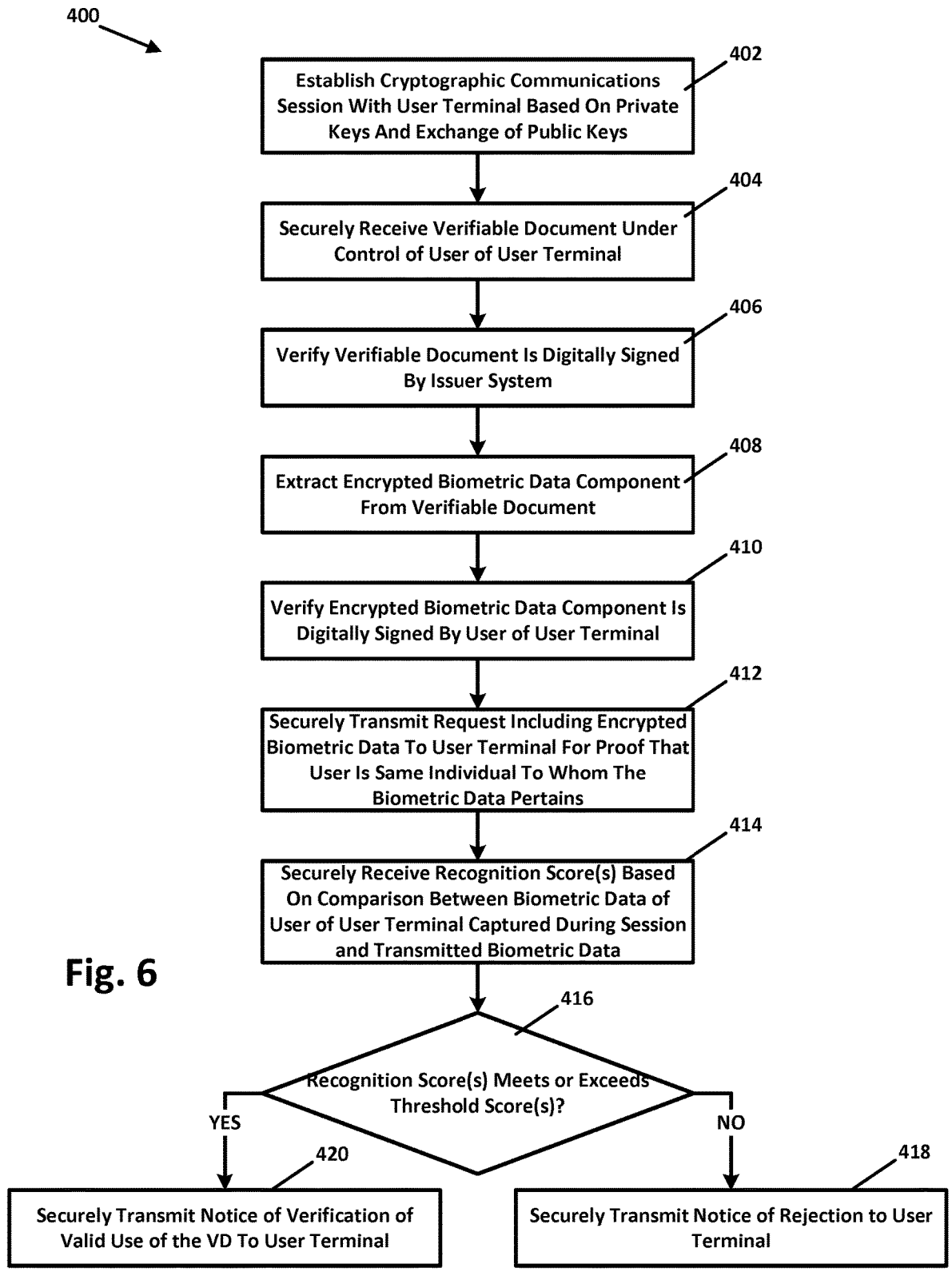
FIG. 6 is a flowchart showing steps in a method conducted by a verifier system for verifying valid use of a verifiable document presented to it, in accordance with the process of FIG. 5.

FIG. 6 is a flowchart showing steps in a method 400 conducted by a verifier system for verifying valid use of a verifiable document presented to it, in accordance with process 350 described above. It will be appreciated that the following sets forth method 400 from the perspective of the verifier system.

Initially, a cryptographic communications session with the user terminal over a communication network based on private keys and exchange of public keys is established (step 402).

A verifiable document is securely received under the control of the user terminal (step 404) in associated with a request for verification of valid use of the verifiable document. In this embodiment, the verifiable document is transmitted by the user terminal. The verifier system verifies that the verifiable document has been digitally signed by an authorized issuer system (step 406), and then extracts an encrypted biometric data component from the verifiable document (step 408). In this embodiment, the verifier system also verifies that the encrypted biometric data component is digitally signed by the user of the user terminal (step 410), but the process may proceed to step 412 without step 410 to securely transmit a request to the user terminal for proof that the user is the same individual to whom the biometric data pertains (step 412) along with the encrypted biometric data component.

Pursuant to this, and pursuant to the user terminal responding to the request for proof that the user of the user terminal is the same individual to whom the biometric data pertains, one or more recognition scores are securely received from the user terminal, the recognition score(s) having been generated based on a comparison between biometric data of the user of the user terminal captured during the session, and the biometric data in the encrypted biometric data component that was transmitted to the user terminal (step 414).

In the event that the recognition score(s) do not meet or exceed a threshold score(s), then the verifier system securely transmits a notice of rejection to the user terminal (step 418). Otherwise, in the event that the recognition scores do meet or exceed the threshold score(s), then the verifier system securely transmits a notice of verification and valid use by the user of the user terminal of the verifiable document (step 420).

In embodiments, face recognition can be conducted entirely by the user agent at the UT, entirely by the VS, partly by each where processing is shared between the UT and the VS. It will be appreciated, however, that which ever approach is implemented, the IS having digitally-signed the verifiable document containing the encrypted biometric data component acts as evidence that the IS had been involved in an identity verification process that resulted in the binding of the identity of the individual to whom the verifiable document and/or credentials pertain so that the individual can later prove ownership and control. This can be verified as described herein by the VS.

Figure 7:
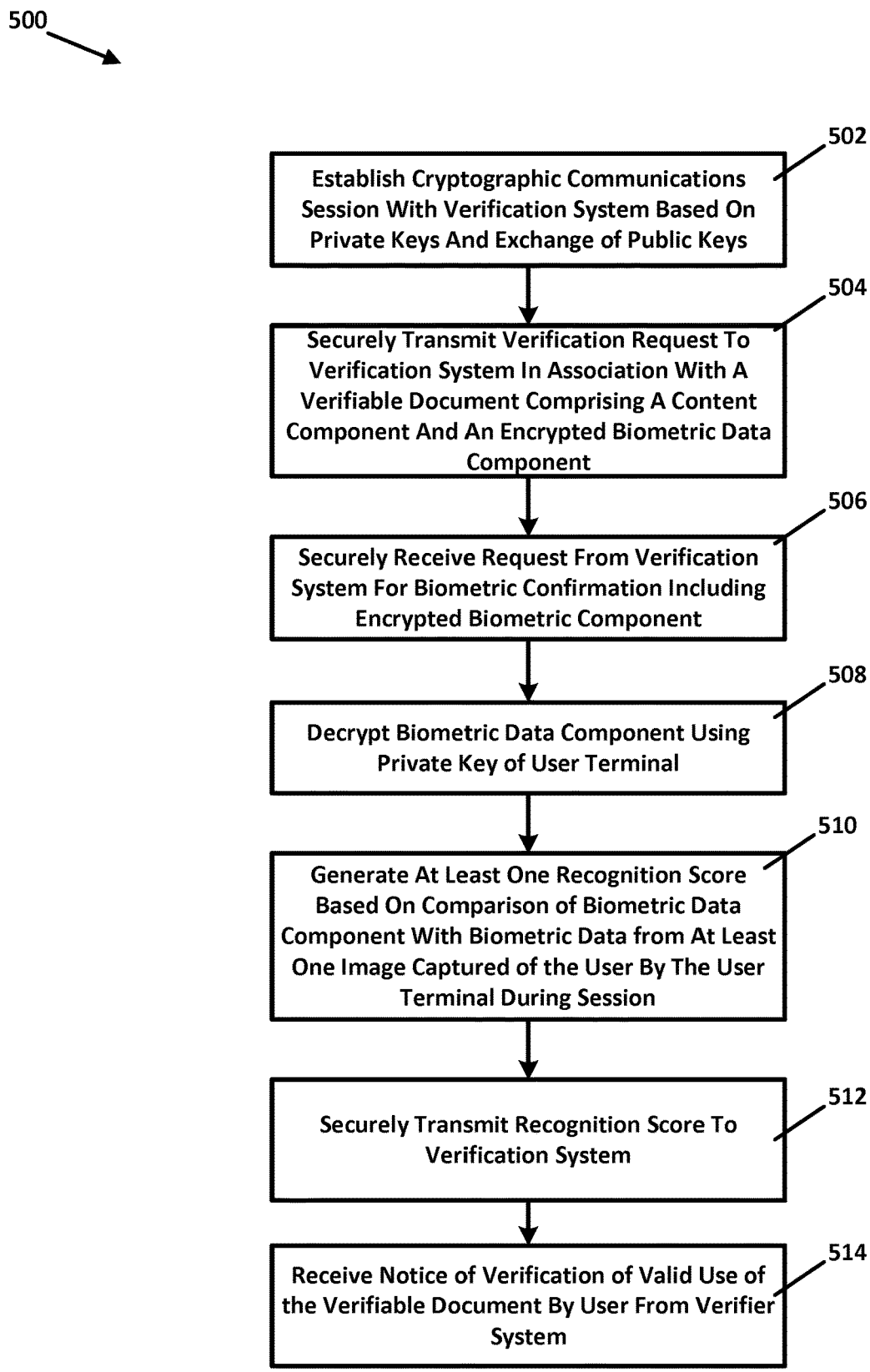
FIG. 7 is a flowchart showing steps in a method conducted by a user terminal for obtaining verification of valid use of a verifiable document, in accordance with the process of FIG. 5.

FIG. 7 is a flowchart showing steps in a method 500 conducted by a user terminal for obtaining verification of valid use of a verifiable document, in accordance with process 350 described above. It will be appreciated that the following sets forth method 500 from the perspective of the user terminal.

Initially, a cryptographic communications session with the verification system over a communication network based on private keys and exchange of public keys is established (step 502).

The user terminal securely transmits a verification request to the verification system in association with a verifiable document comprising a content component and an encrypted biometric data component (step 504). A request is then securely received from the verification system for biometric confirmation, and the request is accompanied by the encrypted biometric component that the verification system has extracted from the verifiable document (step 506). Receipt of this request may, in embodiments, be taken as confirmation that the verifier system has verified the verifiable document as having been digitally signed by an authorized issuer system, such as a credential issuer. However, in this description, the verifier system is still required to seek confirmation that the user of the user terminal is the individual authorized to wield or otherwise user the verifiable document that was transmitted by the user terminal to the verifier system.

Responsive to receiving the request for biometric confirmation, the user terminal decrypts the received biometric data component using the private key of the user terminal (step 508). The user terminal then generates at least one recognition score based on a comparison between the biometric data component and biometric data—in this embodiment, face biometric data—from at least one image captured of the user of the user terminal by the user terminal during the session (step 510). The recognition score(s) is/are then securely transmitted to the verifier system (step 512). In the event that the verifier system considers the recognition scores to meet or exceed a threshold score(s), the user terminal will securely receive a notice of valid use of the verifiable document by the user from the verifier system (step 514). In the event that the user terminal does not receive such a positive verification, it may be considered that the verifier system has not verified that the verifiable document can be validly used by the user of the user terminal.

In embodiments, digitally signed document(s) can include a signing component of one or more digital documents or the hash of the one or more digital documents. The signing component may provide electronic evidence (including biometric data) to confirm or authenticate the one or more digital documents (including an electronic signature therein). The signing component can be a modified version of the one or more digital documents that can be attached or appended to the original one or more digital documents to provide electronic evidence while keeping the original digital document unchanged. For example, the signing component may be generated by either inserting a challenge biometric and/or another digital image into a document. The package of digitally signed documents includes the signing component and the document. The package of digitally signed components is then signed using a private key linked to the credential or document issuer in the enrollment/verification biometric/face template or image to authenticate the challenge selfie.

In embodiments, the one or more digital documents or credentials may be stored remotely and may be large in file size. Instead of adding the actual one or more digital documents to the package of digitally signed documents instead a hash of the actual one or more digital documents can be used.

In embodiments, the digital document may involve document or transaction data that is local or remote relative to components implementing the signing process. The location of the document or transaction data may trigger different verification processes, signing processes and authentication processes.

In embodiments, the digital document or verifiable credential may involve document or transaction data that is local relative to components implementing the signing process. For example, a user's agent and device may implement the signing process and also store the digitally signed document as a self signed verifiable credential or document. Conversely the credential issuer can digitally signed the verifiable credential or documents and share it with the user and optionally store the documents as the issuer. The stored credential or document is held encrypted such that only the user and decrypt thus providing secure back up and recovery service by the issuer. If the document is to be shared between the two parties then the documents could be encrypted and the time of creation so both parties have an encrypted copy. Furthermore the document could be a shared documents that both parties sign as evidence of the verification of each other in the document.

The digital asset may involve document or transaction data that is remote relative to components implementing the signing process. For example, a user's agent or device may implement the signing process and a separate data storage device or service such as a cloud that is remote to the client device to store the document or transaction data.

It will be appreciated that applications for an encrypted biometric data component of a document that is not digitally signed by an issuer system, such as a credential issuer, may be useful. While a third party would not have a digital signature of the issuer system to verify the document against, the third party would still be able to challenge the user wielding or otherwise using the document at the time of use by requiring the user to decrypt, and conduct a biometric verification against, the biometric data component before the use of the document by the user is considered valid.

In this description, the user terminal, the issuer system, and the verifier system are intended to be third parties with respect to each other. Each of these systems/terminals may be implemented using computing systems or devices configured and arranged in accordance with the present description.

Figure 8:
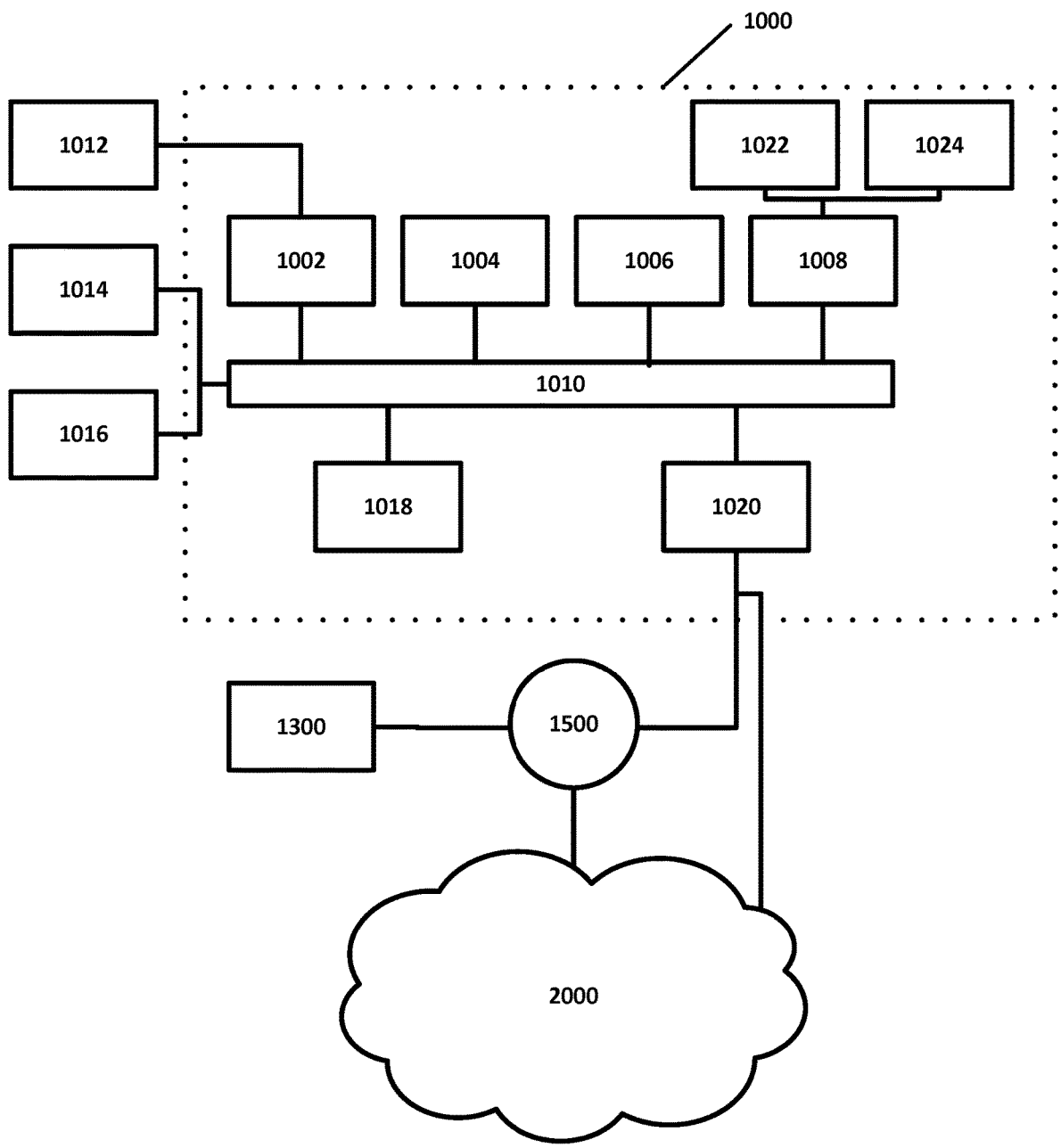
FIG. 8 is a schematic diagram showing a hardware architecture of a computing system suitable as the computing system for any of the user terminal or individual terminals or servers of the issuer system and the verifier system.

FIG. 8 is a schematic diagram showing a hardware architecture of a computing system 1000. Computing system 1000 is suitable as the hardware platform for any individual user terminal, any individual terminals or servers in the issuer system, and any individual terminals or servers in the verifier system. Computing system 1000 may also be suitable as the hardware platform for other computing systems to be integrated with or to interact with the specific terminals or systems whose functions are described herein.

A particular computing system 1000 may be specially configured with software applications and hardware components to enable a user and a user terminal to conduct cryptographic communications using a communications channel with other computing systems and terminals.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 includes input devices, such as a keyboard 1014 and a pointing device 1016, for interacting with a user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user (e.g., for controlling mixing of live-streams of audio and video and other media). Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs). Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Furthermore, the computing system may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, or any combination thereof.

Throughout the preceding and following discussion, references are made regarding agents and credential issuers and verifiers. Agents and credential issuers and verifiers may use smart phones, personal computers, servers, services, interfaces, portals, platforms, or other systems formed from computing devices. It should be appreciated that the use of such terms is deemed to represent one or more computing devices/systems having at least one processor configured to execute software instructions stored on a computer readable tangible, non-transitory medium. For example, a server can include one or more computers operating as a web server, database server, or other type of computer server in a manner to fulfill described roles, responsibilities, or functions.

The preceding discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The term agent, wallet, credential issuer and verifier are terms used for the describing the inventions. These terms are used to reflect terms used by the community at this time to develop what is called Trust of IP. Other terms such as client, server, application program and more are equally relevant for describing the invention as are other communities such as PKI. Fido and MobileConnect One or more aspects of the technical solution provided by the embodiments described herein may be implemented in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute one or more aspects of the technical solution provided by the embodiments.

The embodiments described herein are implemented by physical computer hardware, including computing devices, servers, receivers, imaging sensors, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware elements are clearly essential to the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Computing devices may be operable to register and authenticate users (using a biometric login, unique identifier, and password for example) prior to providing access to applications, a local network, and network resources, other networks and network security devices. Computing devices may serve one user or multiple users.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

Although embodiments have been described with reference to the drawings, those of skill in the art will appreciate that variations and modifications may be made without departing from the spirit, scope and purpose of the invention as defined by the appended claims.

For example, methods and techniques disclosed herein may be deployed to inspect a digitally signed file and inspect the digital signatures associated with the digitally signed file. To review and authenticate a document the document could opened by a user using software appropriate to the file format, whether it be a file format such as PDF, XML, Word, or other file. The document or file components that are displayable can include the digitally signed encrypted biometric data. If the attempted user/wielder of the document is the individual to whom the encrypted biometric data pertains, the user at some future date can authenticate against the document using biometric authentication as described herein to decrypt and display the biometric data itself, such as the selfie photo, a database photo, the photo ID, or actual face templates generated therefrom. This would enable a user to display a document, such as a digital drivers license, in a physical environment such as in an airport, or for a police check, for age verification, to a relying/verifying party physically and not necessarily digitally over a communications network.

What is claimed is:

1. A processor-implemented method conducted by an issuer system for issuing a new verifiable document, the method comprising:
   establishing a cryptographic communications session over a communication channel with a user terminal;
   receiving a request from the user terminal for a new verifiable document;
   verifying an identity of a user of the user terminal based on at least one recognition score received from the user terminal corresponding to a comparison of data from at least one image captured of the user during the session by the user terminal and photo ID data obtained during the session by the user terminal;
   responsive to verifying the identity of the user of the user terminal based on the at least one recognition score received from the user terminal, transmitting a notice of identity verification to the user terminal;
   digitally signing, with the issuer's private key, both the verifiable document and a biometric enrollment template;
   encrypting the signed verifiable document and the signed biometric enrollment template with the public key of the user terminal; and
   transmitting the encrypted verifiable document and encrypted biometric enrollment template to the user terminal for control by the user terminal.

2. The method of claim 1, wherein verifying the identity of the user of the user terminal comprises:
   receiving the at least one recognition score, the at least one recognition score generated based on a comparison between:
      biometric data from the at least one image captured of the user during the session by the user terminal; and
      the photo ID data.

3. The method of claim 2, wherein the photo ID data comprises at least one of:
   image data captured of a photo ID by an image capture device of the user terminal during the session;
   image data of a photo ID retrieved by the user terminal from storage during the session;
   image data retrieved by the issuer system from a photo database responsive to receipt, from the user terminal, of the image data captured of the photo ID by the image capture device or the image data of the photo ID retrieved by the user terminal from storage.

4. The method of claim 1, wherein the new verifiable document is a verifiable credential.

5. A processor-implemented method conducted by a user terminal for obtaining a new verifiable document, the method comprising:
   establishing a cryptographic communications session over a communication channel with an issuer system;
   transmitting a request to the issuer system for the new verifiable document;
   causing a provision of evidence of identity of the user of the user terminal to the issuer system, the evidence of identity comprising at least one recognition score generated based on a comparison of data from at least one image captured of the user during the session by the user terminal and photo ID data obtained during the session by the user terminal, wherein the at least one recognition score is transmitted by the user terminal;
   receiving, from the issuer system, the encrypted verifiable document and encrypted biometric enrollment template;
   decrypting, with the private key of the user terminal, the signed verifiable document and signed biometric enrollment template;
   storing the signed verifiable document and signed biometric enrollment template;
   responsive to receiving request for proof of identity performing biometric authentication by comparing a live biometric of the user with the signed biometric enrollment template;
   upon successful biometric authentication, releasing the private key of the user terminal for use in cryptographic operations including signing or decrypting operations required for proof of possession; and
   responsive to successful proof of possession, receiving, from the issuer system, the new verifiable document.

6. The method of claim 5, wherein the photoID data comprises at least one of:
   image data captured of a photoID by an image capture device of the user terminal during the session;

image data of a photoID retrieved by the user terminal from storage during the session; and image data retrieved by the issuer system from a photo database responsive to receipt, from the user terminal, of the image data captured of the photoID by the image capture device or the image data of the photoID retrieved by the user terminal from storage.

7. The method of claim 5, wherein the new verifiable document is a verifiable credential.

8. A processor-implemented method conducted by a verifier system for verifying valid use of a verifiable document, the method comprising:

establishing a cryptographic communications session over a communication channel with a user terminal;

receiving, in association with a verification request from the user terminal, a verifiable document and a biometric enrollment template, both digitally signed by an authorized credential issuer;

verifying whether the verifiable document is digitally-signed by the credential issuer using the issuer's public key;

validating that the biometric enrollment template is digitally signed by the credential issuer, wherein validating comprises using the issuer's public key to decrypt the signature on the biometric enrollment template and comparing a recomputed hash of the template with the decrypted hash, equality evidencing validity of the enrollment template;

responsive to successful validation of both the verifiable document and the biometric enrollment template, transmitting a request for biometric confirmation to the user terminal;

receiving at least one recognition score from the user terminal, the score generated locally after biometric authentication against the biometric enrollment template releases the private key of the user terminal for use during the session;

responsive to determining that the recognition score meets or exceeds a threshold level, verifying valid use of the verifiable document; and transmitting a notice of verification of valid use of the verifiable document to the user terminal.

9. The method of claim 8, wherein determining whether the user terminal during the session is under the control of the individual to whom the biometric data component pertains comprises:

transmitting a request for a biometric confirmation to the user terminal, the request including the encrypted biometric data component;

receiving the at least one recognition score based on the comparison of the biometric data component with biometric data from the at least one image captured by the user terminal, during the session, of the user controlling the user terminal; and responsive to each of the at least one recognition score meeting or exceeding a threshold level, determining that the user controlling the user terminal during the session is the individual to whom the biometric data component pertains.

10. The method of claim 9, wherein the comparison is conducted by the user terminal.

11. The method of claim 9, wherein the biometric data component comprises:

(a) at least one of: an image captured of the individual at the time the individual applied for the verifiable document, and a biometric face template generated based on the image captured of the individual at the time the individual applied for the verifiable document; and (b) at least one of: a photoID photo captured and/or retrieved at the time the individual applied for the verifiable document, and one or more biometric face templates generated respectively based on the photoID photo captured and/or retrieved at the time the individual applied for the verifiable document.

12. The method of claim 8, wherein receiving, in association with the verification request from the user terminal, the verifiable document comprises receiving the verifiable document from the user terminal.

13. The method of claim 8, wherein the verifiable document is a verifiable credential.

14. A processor-implemented method conducted by a user terminal for obtaining verification of valid use of a verifiable document, the method comprising:

establishing a cryptographic communications session over a communication channel with a verification system;

transmitting a verification request to the verification system in association with a verifiable document, the verifiable document comprising a content component and biometric enrollment template digitally signed by an authorized credential issuer;

receiving a request for a biometric confirmation from the verification system, the request including the issuer-signed biometric enrollment template;

validating, with the issuer's public key, the digital signature on the biometric enrollment template;

authenticating a live biometric of the user against the issuer-signed biometric enrollment template;

responsive to successful biometric authentication, (i) releasing a private key of the user terminal for use during the session to perform cryptographic operations, and/or (ii) generating at least one recognition score at the user terminal based on comparison of the live biometric with the biometric enrollment template;

transmitting the recognition score and, where applicable, a cryptographic operation performed with the released private key, from the user terminal to the verification system; and responsive to the verification system determining that the at least one recognition score meets or exceeds a threshold level and that the issuer's signature on the biometric enrollment template is valid, receiving a notice of verification of valid use of the verifiable document from the verifier system.

15. The method of claim 14, wherein transmitting, in association with the verification request from the user terminal, the verifiable document comprises transmitting the verifiable document from the user terminal.

16. The method of claim 15, wherein the biometric data component comprises:

(a) at least one of: an image captured of the individual at the time the individual applied for the verifiable document, and a biometric face template generated based on the image captured of the individual at the time the individual applied for the verifiable document; and (b) at least one of: a photoID photo captured and/or retrieved at the time the individual applied for the verifiable document, and one or more biometric face templates generated respectively based on the photoID photo captured and/or retrieved at the time the individual applied for the verifiable document.

17. The method of claim 14, wherein the verifiable document further comprises an encrypted biometric data component.

18. The method of claim 14, wherein the verifiable document is a verifiable credential.

\* \* \* \* \*